United States Patent [19]

Hise et al.

[11] Patent Number: 4,510,756

[45] Date of Patent: Apr. 16, 1985

[54] COGENERATION

[75] Inventors: Ralph E. Hise; Paul F. Swenson, both of Shaker Hts., Ohio

[73] Assignee: Consolidated Natural Gas Service Company, Inc., Cleveland, Ohio

[21] Appl. No.: 439,520

[22] Filed: Nov. 8, 1982

Related U.S. Application Data

[63] Continuation-in-part of Ser. No. 323,174, Nov. 20, 1981, abandoned.

[51] Int. Cl.³ .......................... B60H 1/02; H02P 9/04; F24D 3/02
[52] U.S. Cl. .................................... 60/659; 237/12.1; 290/2
[58] Field of Search ............................. 290/2; 60/659; 237/12.1

[56] References Cited

U.S. PATENT DOCUMENTS

| 2,051,240 | 8/1936 | Berryman | 290/2 |
| 3,678,284 | 7/1972 | Peters | 290/2 X |
| 3,944,837 | 3/1976 | Myers et al. | 290/2 X |
| 4,065,055 | 12/1977 | De Cosimo | 290/2 X |

Primary Examiner—Allen M. Ostrager
Attorney, Agent, or Firm—Pearne, Gordon, Sessions, McCoy, Granger & Tilberry

[57] ABSTRACT

A cogeneration plant for a site having an expected daily thermal load. In one embodiment, the plant includes a heat engine/electrical power generator set and a heat storage unit. The engine/generator set is sized to normally operate only during the peak rate period of the central electric service utility while rejecting a quantity of heat equal to the daily thermal load at the site. The storage unit is sized to contain a quantity of heat equal to the daily thermal load reduced by that portion of the daily load incurred during the peak rate period. In another embodiment, the cogeneration plant includes a fuel cell electrical power generator serving a local energy-integrated community. The fuel cell is sized to reject a quantity of heat to satisfy the collective average daily thermal load at the community site. Separate thermal storage sections are provided for high and low grade rejected heat.

18 Claims, 7 Drawing Figures

COGENERATION

BACKGROUND OF THE INVENTION

This is a continuation-in-part of our copending application Ser. No. 323,174, filed Nov. 20, 1981, now abandoned.

The invention relates to energy conservation systems and in particular to a cogeneration plant located at a site having a thermal load.

Prior Art

Conventional centralized electric utility plants, while operating at relatively high thermodynamic efficiency, cannot utilize the bulk of their rejected low-grade (low-temperature) heat, since ordinarily there is not a sufficient thermal load in the immediate vicinity of the plant. Therefore, in the operation of such existing central electric utility plants there is inherent heat waste.

Another factor experienced in the operation of conventional electric utility plants is a variation in demand or load. This variation in demand, over a daily cycle, may, for example, range from 2:1 to 3:1 between peak and non-peak periods, with the peak load period generally corresponding to normal business hours. In practice, economics dictates that the cost of producing power at high levels is greater than that for producing at moderate levels. For instance, during a peak load period of a daily cycle, the utility company purchasing power from another affiliated company to supplement its production will pay more for such power than it would be charged at off-peak hours when other affiliated power companies have excess capacity.

SUMMARY OF THE INVENTION

The invention provides a cogeneration station at a site having a daily thermal load adapted to complement the peak load or rate of the electric utility serving the site. The cogeneration station is sized and operated to maximize its economic benefits while conserving appreciable quantities of energy as usable heat. Energy conserved in the practice of the invention can be a significant fraction of that which would otherwise be consumed at the site.

As disclosed, the invention takes into consideration the daily cyclical nature of the peak load demand on the electric utility power grid. The cogeneration plant in one embodiment is provided principally with a source of combustible fuel, a heat engine/electrical power generator set, a heat storage unit, an electrical connection to the utility grid, and suitable controls. Ideally, the thermal storage unit has a heat storage capacity determined by the expected daily thermal load and the engine/generator set is sized in such a manner that it can be operated only during the peak load period on the utility grid while providing sufficient rejected heat to fully charge the heat storage unit and satisfy contemporaneous thermal demand during its period of operation.

In a second embodiment, the cogeneration station comprises a fuel cell that converts the chemical energy of natural gas or other like fuel directly into electricity. The fuel cell is arranged to serve an energy-integrated community of a plurality of separate building structures. The fuel cell is sized such that the heat produced and rejected in its chemical conversion process equals the expected daily average thermal load of the building structure served at the site when operated only during the peak load period of the utility grid. In this way, the value of electricity produced by the fuel cell is maximized. Sufficient heat storage capacity is provided to store the rejected heat produced during the limited period of operation, for use through a daily cycle.

DESCRIPTION OF THE PREFERRED EMBODIMENT

Figure 1:
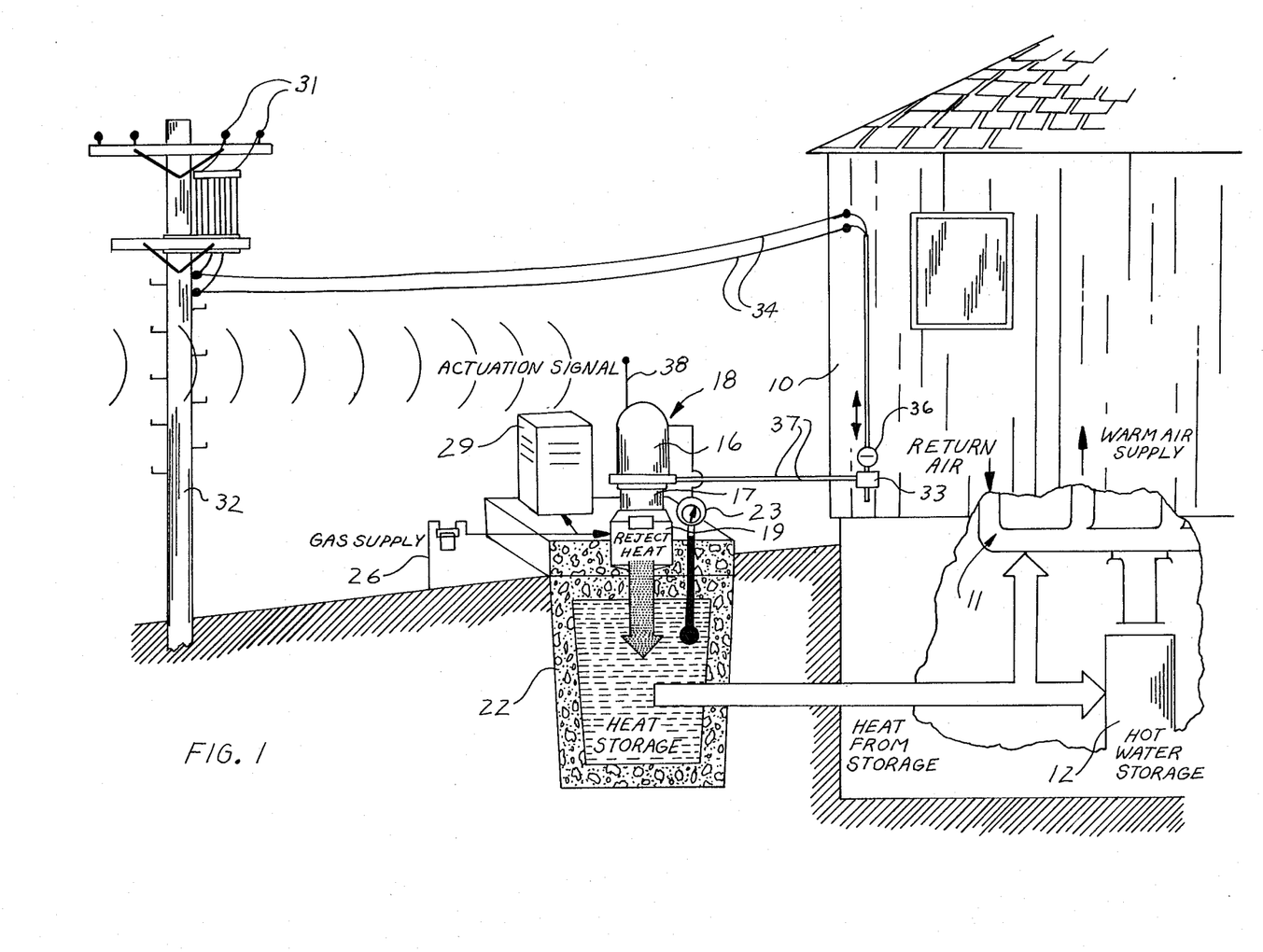
FIG. 1 is a schematic illustration of a cogeneration plant situated at a residential building and arranged to provide for the thermal load of space heating and domestic water heating at this site.

Referring now to the drawings, there is schematically illustrated in FIG. 1 a residential building 10 in the form of a single family dwelling which typically has a daily thermal load principally comprising space heating and domestic hot water heating. These components of the thermal load are represented as a forced-air heating system diagrammatically indicated at 11 for circulating heated air through the building 10 and a domestic hot water supply tank 12. Located at the site of the building is a heat engine 16 and an electrical power generator 17 powered by the heat engine. The heat engine 16 and generator 17 are illustrated as a modular cogeneration set or plant 18 having a base 19. The cogenerator base 19 rests directly on a heat storage unit 22 so as to conveniently provide thermal communication between the engine/generator set or cogenerator 18 and the heat storage unit. While the cogenerator 18 and heat storage unit 22 are illustrated as situated outside of the building 10, it will be understood that other arrangements, wherein either the cogenerator or storage unit, or both, are provided in the building, are contemplated. In any case, the cogenerator set 18 is in an appropriate manner arranged in thermal communication with the heat storage unit 22. The heat storage unit 22 contains a suitable heat storage medium such as water, water and rocks, or a molten salt. The quantity of heat in the storage unit is sensed, for example, by a temperature-measuring control device 23, which may be a thermostat or other suitable means.

A natural gas supply line 26 provides combustible fuel to the heat engine 16. The heat engine 16 may comprise known types such as an internal combustion reciprocating engine, sterling engine, steam engine, turbine engine or the like. The electrical generator 17 is of any suitable known type compatible with the type of selected engine 16 and converts the mechanical energy produced by the engine into electrical energy. An auxiliary combustion heater 29, for example in the form of a conventional boiler, is also in thermal communication with the heat storage unit 22. The auxiliary heater 29 is fueled by natural gas from the supply line 26.

The residential building 10 is serviced by a central power station electric service or utility. The power distribution grid of the utility includes overhead lines 31 supported by a utility pole 32. The lines 31 are connected to a service box 33 on the building 10 by lines 34. Electrical power through the service lines 34 to or from the building site is measured by a meter 36 associated with the service box 33. As indicated, the generator 17 of the cogenerator plant 18 is also connected to the service box 33 and the meter 36 by lines 37. In the illustrated arrangement, the engine/generator cogeneration set 18 is provided with a radio receiver associated with an antenna 38 or other means for receiving control signals from the electric power utility.

When electrical power is developed by a heat engine, energy can be conserved through utilization of heat inevitably rejected by the engine. It follows that the cogenerator plant, represented by the engine and generator set 18 and heat storage unit 22 and attendant accessories, has the potential of producing electrical energy in a more energy efficient manner than is achieved in practice with conventional central utility plants where rejected heat is not utilized. The economic potential of the cogenerator plant can approach optimization in accordance with the invention by properly sizing both the capacity of the heat storage unit 22 and the engine/generator set 18. More specifically, as will be explained in greater detail below, both the heat storage unit 22 and engine generator set 18 are sized in relation to the expected daily thermal load at the site and the peak rate period of the electrical utility service. Ordinarily, the peak rate period of the utility service coincides with the peak load period and, for the purposes of this disclosure, these periods can be assumed to be equivalent. Ideally, the engine generator set 18 is sized to operate continuously through the peak rate period and, during such period, to yield a usable quantity of rejected heat equal to the daily thermal load at the site.

Figure 2:
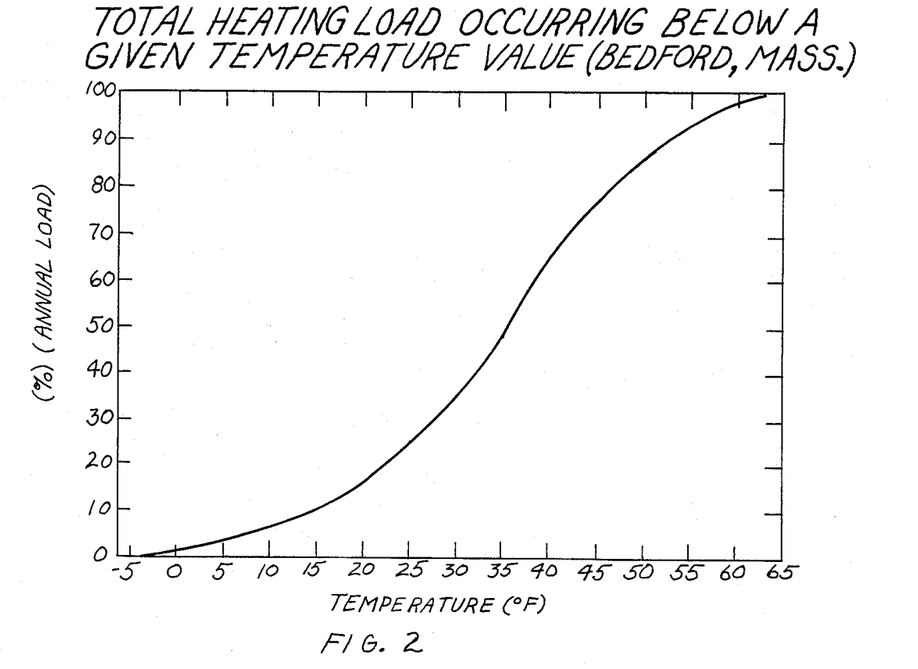
FIG. 2 is a graph illustrating a percentage of typical annual heating load on the residence of FIG. 1 as related to ambient temperature.
Figure 3:
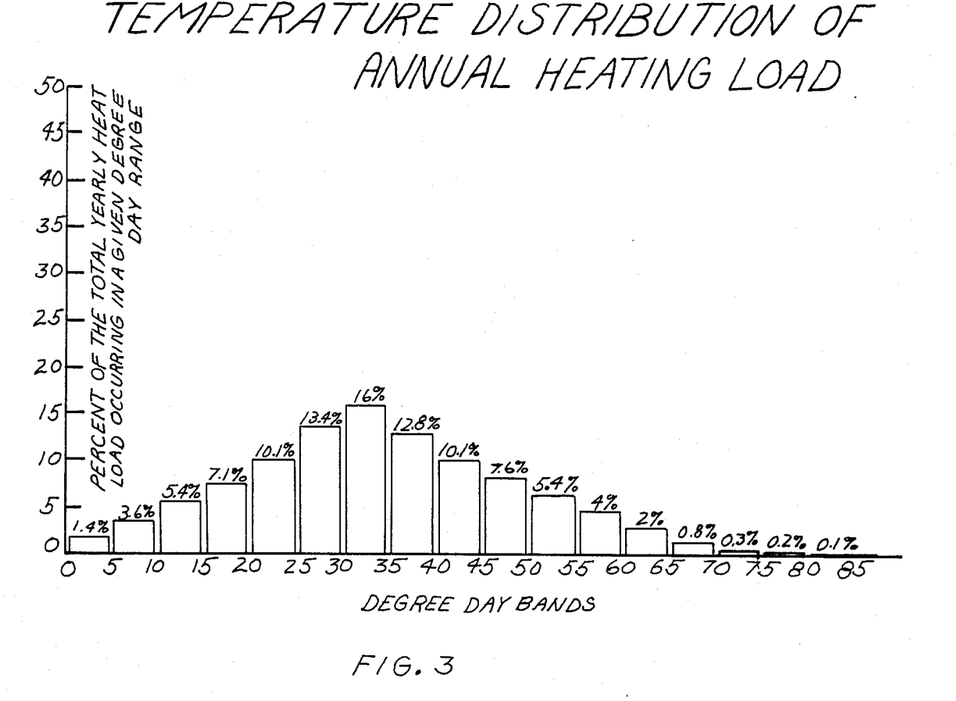
FIG. 3 is a graph illustrating percentage of annual heating load as related to degree day bands.
Figure 4:
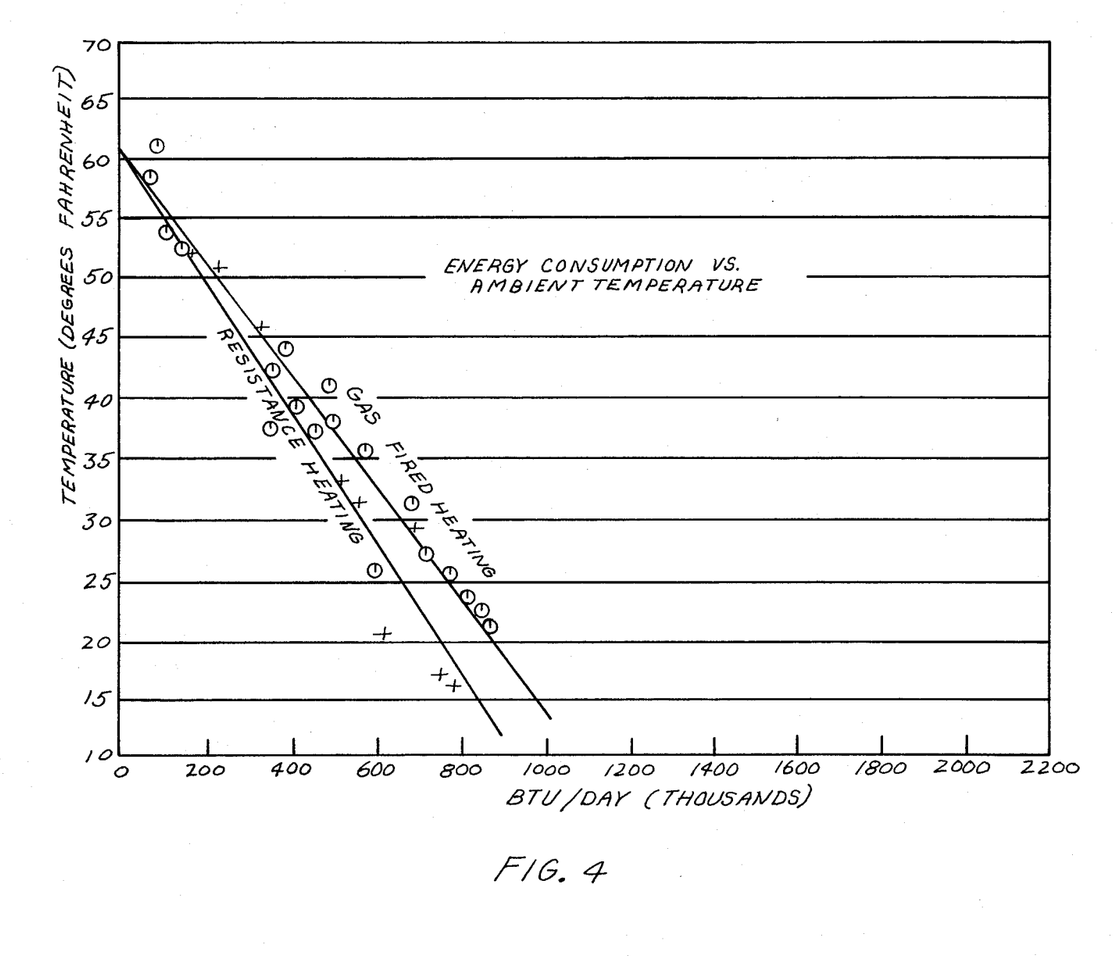
FIG. 4 is an empirically developed graph illustrating heating energy consumption versus ambient temperature of the typical residential building illustrated in FIG. 1.

One method of determining the heat load at the site is as follows. Space heating requirements vary seasonally throughout the year. An estimate of the daily thermal space heating load can be made by studying historical weather data for the site in question. For purposes of illustration, the site of the house 10 is taken as Bedford, Mass., U.S.A. FIGS. 2 and 3 show the annual distribution of space heating load in Bedford, Mass., as a function of outdoor temperature. FIG. 4 shows the linear correlation between outdoor temperature and space heating energy consumption for the home.

Referring to FIGS. 2 and 3, it is shown that 90% of the space heating load occurs at ambient temperatures above 15° F. The home requires 820,000 BTU/day, of space heating energy at +15° F., and 1,450,000 BTU/day at −15° F., which is the coldest day or design day temperature for the location of the home. Therefore, 90% of the annual space heat load can be met with (820,000/1,450,000)×100%, or 57% of the peak day requirement. This indicates that the marginal investment represented by an increase in storage capacity from +15° F. capability to −15° F. capability is not attractive. For example, a 10% increase in annual utilization is gained through a (1,450,000−820,000/820,000)×100%, or 77% increase in capacity investment. In practice, provision for storage capability beyond 60% of design day requirement rarely pays. The marginal economic trade-off between increased utilization and the required investment usually results in designing thermal storage for 50–60% of design-day requirements. For purposes of this disclosure, the phrase "modified design day thermal load" means that portion (e.g., 60%, as above) or the whole of the design day thermal load which is chosen to be provided on an economic and/or environmental basis.

For the purpose of providing an example of electrical generation and thermal storage capacity determinations, the following assumptions will be made.

| | |
|---|---|
| 1. Site location of single family house: | Bedford, Massachusetts |
| 2. Site space heat load: | Per FIG. 6 ($Q_{SH}$) |
| 3. Site water heat load: | 90 Gallons/day (75,000 BTU/day) ($Q_{WH}$) |
| 4. Cogenerator set 18 electrical efficiency: | 18% ($\eta_e$)* |
| 5. Cogenerator set 18 thermal efficiency: | 55% ($\eta_{th}$)* |
| 6. Average annual daily peak rate period of electric utility: | 10 hours |
| 7. Marginal economic cutoff point for daily space heat load capacity | estimated at 60% of design day requirement |

*Based on heat energy of natural gas fuel consumed by cogenerator set 18.

The generation capacity is specified, so that the total thermal energy produced by the cogenerator set 18 during the peak rate period equals 60% of the design day thermal load for the site, as follows:

$$Q_{th\text{-}total} = Q_{SH\text{-}Design} \times .6 + Q_{WH} \quad (1)$$
$$= 1,450,000 \times .6 + 75,000 = 945,000 \text{ BTU/day}$$

$$Q_{th} = Q_{th\text{-}total} \div \text{daily operating time} \quad (2)$$
$$= 945,000 \text{ BTU/day} \div 10 \text{ hours/day}$$
$$= 94,500 \text{ BTU/hour}$$

$$E_e = \eta_e/\eta_{th} \times Q_{th} \times .00029 \text{ Kw hr/BTU} \quad (3)$$
$$= .18/.155 \times 95,400 \text{ BTU/Hr} \times .00029 \text{ Kw Hr/BTU}$$
$$= 9.2 \text{ Kw}$$

Equation (1) is an algebraic expression for a modified design day thermal load. It includes space heating $Q$SH-Design and water heating $Q$WH. The thermal load for water heating $Q$WH can be assumed to be the same each day throughout the year, and a 60% or like factor is not appropriate. Thus, in this example, 100% of the average water heating load $Q$WH is to be supplied.

Equation (3) indicates that the electrical output of the ideal cogenerator will be 9.2 Kilowatts. Electric power generated by the cogeneration unit 18 and not contemporaneously consumed at the site of the house 10 is fed into the utility grid through the meter 36, enabling the owner of the house to be credited for its value during the peak rate period.

The thermal storage capacity of the unit 22 is specified, so that the rejected thermal energy produced by the cogenerator unit 18 during its period of operation in the peak rate period and delivered to the storage unit, in excess of what is used during its period of operation to satisfy the concurrent thermal load, can be entirely contained, as follows:

$$Q_{store} = Q_{th\text{-}total} - Q_{cons.} = Q_{th\text{-}total}\left(1 - \frac{10}{24}\right) \quad (4)$$

$$= 945,000 \left(1 - \frac{10}{24}\right) = 555,000 \text{ BTU}$$

Equation (4) gives the ideal storage capacity of the unit as 550,000 BTU. During an unusually cold day, i.e., one approaching the design day of $-15°$ F., the auxiliary heater 29 is operated to make up any heat deficiency.

As shown in the above equations, the thermal storage capacity specification ($Q_{store}$) is entirely determined by the following:

(1) Electric generation capacity installed at the site ($E_e$)
(2) $\eta_e/\eta_{th}$ for the cogeneration unit employed
(3) The duration of the peak rate period.

Should the electric generation capacity ($E_e$) be specified according to some arbitrary, or non economic criteria, an optimum thermal storage capacity specification can still be provided according to the method shown herein. If $E_e$ is smaller than optimum, $Q_{store}$ is then determined only by $\eta_e/\eta_{th}$ and the duration of the peak rate period, according to equation (4) above. If $E_e$ is larger than optimum, $Q_{store}$ is then determined according to equations (1) and (4) above, which in effect specifies $Q_{store}$ as though $E_e$ were optimized. Where $E_e$ is larger than optimum, within the sense of equation (3), the cogenerator will be operated through an inversely proportionate fraction of the full duration of the peak rate period.

For purposes of explanation, the cogeneration plant of FIG. 1 is relatively simple in form and function. Where the actual space heat load on a given day does not deplete the storage unit of heat, the sensor control 23 delays or prohibits operation of the cogenerator unit 18. Heat losses by conduction, radiation, etc. from the heat storage unit 22 can be considered part of the thermal load and, where significant, factored into the appropriate equations above.

It will be understood by those skilled in the art that the house 10 can be readily provided with a heat powered air conditioner system which operates, for example, under the familiar absorption cycle. The heat load of such an air conditioner extends the utilization of the cogenerator plant through the summer season. An outdoor heat exchanger (not shown) can be selectively thermally connected to the cogenerator set 18 directly or through the heat storage unit 22 when it is desired to operate the cogenerator set during periods that the heat storage unit is heated to capacity. This situation can occur when the electric utility wishes to draw reserve capacity from the plant and, ordinarily, a multitude of like units. Energization of the set 18 in this circumstance is accomplished by transmitting an appropriate signal to the receiver 38 and overriding the sensor control 23. Under such circumstances, it can be presumed that the electric utility service will pay a premium for this electrical power. When desired, the cogenerator set 18 can be controlled by a clock timer which enables the unit to operate, depending on the state of the sensor 23, during the peak rate period where a signal from the central electrical utility is not utilized. While the thermal load at the site of the cogenerator unit 18 has been assumed to be space heating and domestic hot water heating for a single family residence, the inventive concepts disclosed herein are applicable to other installations, both commercial and industrial. Certain features of the invention can be readily applied where the total daily expected thermal load is out of coincidence with the peak rate period by virtue of being substantially out of phase and/or of substantially longer duration than the peak rate period.

Figure 5:
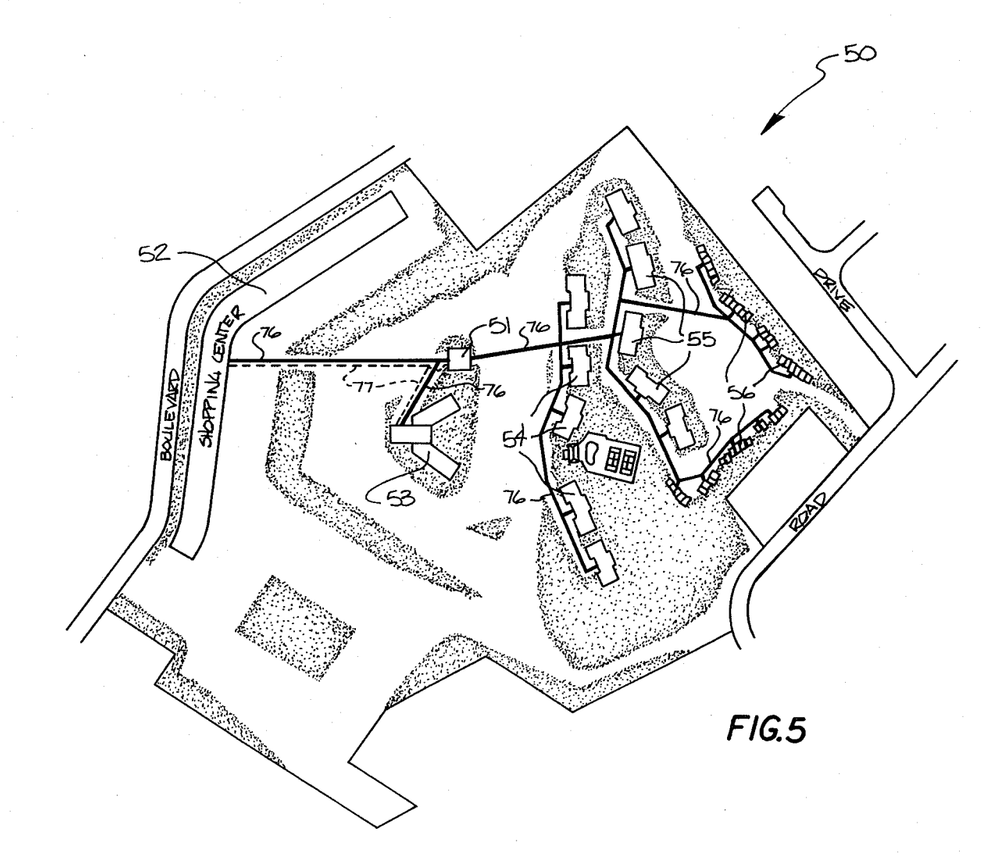
FIG. 5 is a schematic aerial view of an energy-integrated community which embodies a second variation of the invention.
Figures 6, 6A:
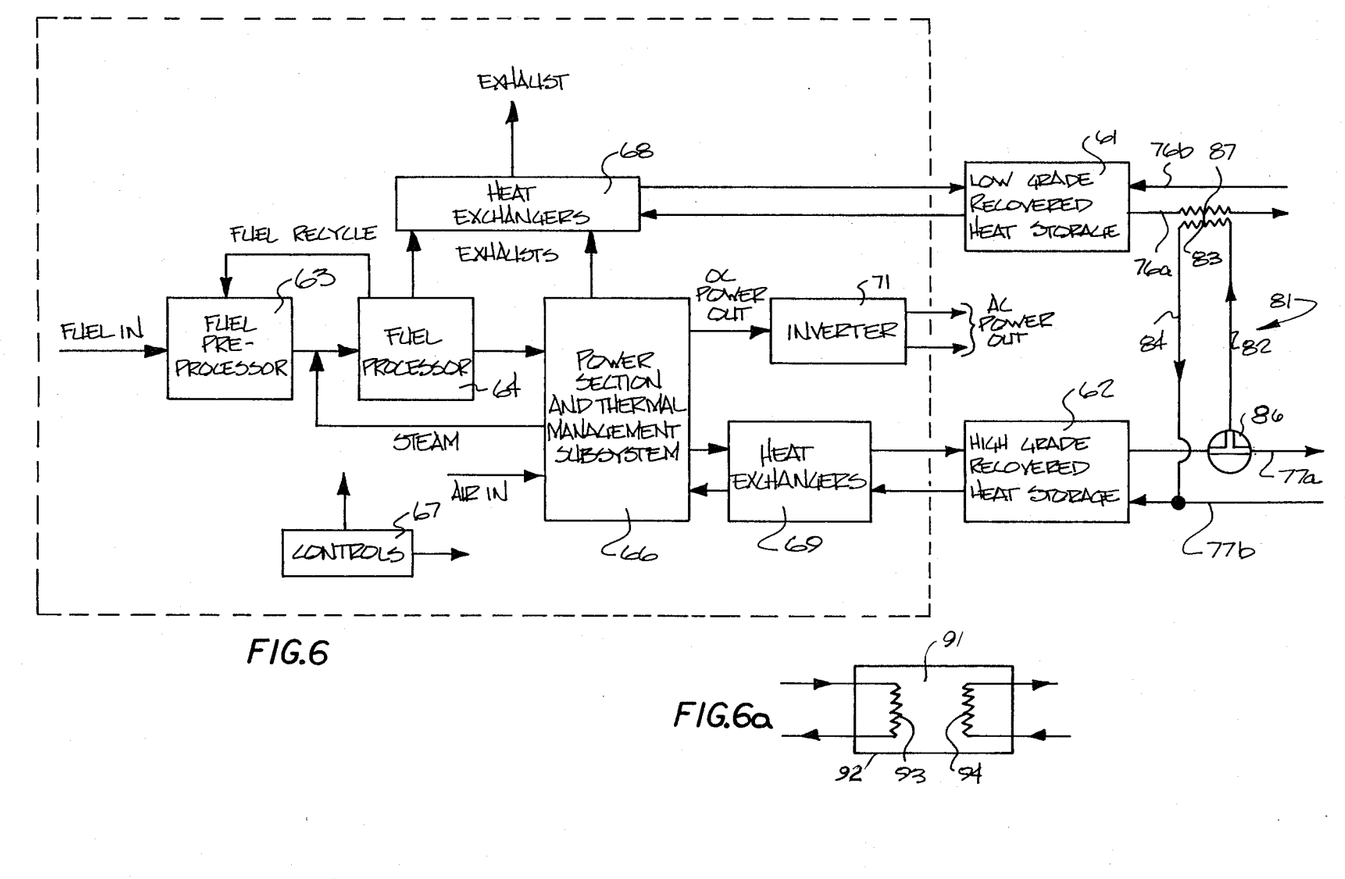
FIG. 6 is a schematic block diagram of a cogeneration station employed in the energy system of FIG. 5.
FIG. 6a is a schematic diagram of a high grade heat storage unit as used the plant of FIG. 6.

FIG. 5 schematically illustrates another application of the invention in a cogeneration energy system on a scale considerably larger than that illustrated in FIG. 1. FIG. 5 is a schematic aerial view of a combined business and residential community served by an integrated community energy system generally designated by the numeral 51. As shown, the community 50 includes a shopping center 52, an office building 53, high-rise apartments 54, low-rise apartments 55, and townhouses 56. In the illustrated case, all of the building structures are heated and certain ones are cooled by the central energy plant 51. FIG. 6 is a schematic block diagram of the principal components of the energy plant 51.

The central energy plant 51 includes a fuel cell 57 and associated heat storage units 61,62. The fuel cell 57 typically includes a fuel preprocessor 63, a fuel processor 64, a power section and thermal management subsystem 66, and suitable controls 67. Heat exchangers are represented at 68 and 69. D.C. power produced in the power section 66 is changed to A.C. power by an inverter 71.

Fuel, in the form of natural gas, for example, enters the fuel preprocessor subsystem 63, comprising a preoxidizer and hydrodesulfurizer, where it is processed. This mixture of fuel and recycled processed fuel flows through the preoxidizer section of the preprocessor 63, where oxygen is removed if it is present, and then the hydrodesulfurizer section, where sulfur is removed. The desulfurized fuel, mixed with steam, enters the fuel processor 64 where the fuel and steam are catalytically converted into a hydrogen-rich gas. The hydrogen-rich gas, cooled and filtered, flows to the power section 66. The power section 66 electrochemically combines hydrogen from the hydrogen-rich gas and oxygen from processed air and produces direct current. Water is produced as a byproduct of the electrochemical process. The A.C. power output of the inverter 71 is connected to the electric utility grid serving the community 51 in a manner analogous to that disclosed above in connection with the system shown in FIG. 1.

The thermal management subsystem of the power section 66 controls the power section temperature by circulating water through the power section. Heat generated in the process of producing electrical power is removed from the power section 66 by changing the circulating water into a two-phase mixture of steam and water. Steam is separated in the power and thermal management subsystem 66 for use in the fuel preprocessor 63. The water component of the two-phase mixture is recycled through a coolant loop associated with the high grade heat exchanger 69.

High grade rejected heat is thereby recovered by directing this power section coolant through the high grade heat exchanger 69, where water or another medium from the high grade storage heat storage unit 62 is heated to a maximum temperature of 275° F., for example. Low grade heat is recovered by passing the power section and fuel processing exhaust through the low grade heat exchanger 68, where heat is transferred to a storage medium, such as water or the like, of the low grade heat storage unit 61. When, as desired or necessary, either high or low grade heat production exceeds the capacity of the respective storage units 61,62, air-cooled heat exchangers can be provided in the circuits associated with these storage units to provide sufficient cooling for continued power plant operation.

The type of fuel cell energy system 57 disclosed in FIG. 6, when operating at or near design capacity, produces approximately twice as much low grade heat as high grade heat. In general terms, the fuel cell system 57, when operating at 100% of its rated power, will convert 40%, roughly, of the fuel energy into electricity and another 40% into low and high grade heat. The recovery of rejected heat at two distinct levels, low grade heat at typically 100° to 120° F. in the low grade heat storage unit 61 and high grade heat at typically 220° to 275° F. in the high grade heat storage unit 62 is an advantage in an energy-integrated system such as that disclosed. Normal space heating and water heating requirements are ordinarily satisfied with low grade heat, but it is not presently practical to utilize low grade heat for space cooling. High grade heat at 220° F., however, can be successfully used with absorption-type air conditioners.

The high grade heat storage unit 62 is arranged to supply thermally driven absorption-type air conditioners in the business and commercial buildings 52,53. The recovered heat in the low grade heat storage unit 61 is primarily utilized for space heating of the remaining buildings of the community 50 and water heating. Each of the low and high grade heat storage units 61,62 is sized to store a quantity of heat equal to its respective modified design day thermal load reduced by that portion of the daily thermal load which is supplied concurrently with operation of the plant 51 during the peak rate period. Suitable control devices, such as thermostats, monitor the states of the heat storage units 61,62 and interact with the controls 67 to normally avoid operation of the cogeneration plant 51 when the heat storage units contain their respective capacities of heat. The sizing of the thermal storage units 61,62 is based on modified design day thermal load calculations similar to those explained above in connection with the system of FIG. 1. As before disclosed, it is contemplated that the fuel cell cogeneration system 51 will normally only be operated during the peak rate period of the electric utility serving the community 50, so that the value of the electrical energy produced by the fuel cell 57 will be maximized. It is understood that suitable controls for operating the plant 51 during the peak rate period or at other times, when desired or necessary, are employed in appropriate manner analogous to that disclosed in connection with the system disclosed in FIG. 1.

As diagrammatically shown in FIG. 5, the heat storage units 61,62 of the plant 51 are situated centrally with respect to the building structures, and are within several hundred feet, for example, of each of such buildings. The heat storage units 61,62 are connected to the several structures by heat service lines 76,77, respectively. The lines 76,77 represent loop circuits of parallel supply (76a, 77a, in FIG. 6) and return lines (76b, 77b, in FIG. 6) for a circulating fluid such as water or suitable heat pipes. The lines 76,77 include main trunks and service branches at individual buildings. It is understood that certain buildings, for example, the commercial buildings of the shopping center 52 and office buldings 53, may have separate service lines as shown in FIG. 6 for the low grade heat storage unit 61 and the high grade heat storage unit 62.

High grade heat can be utilized to supplement the supply of low grade heat. With reference to FIG. 6, a heat transfer loop generally designated at 81 includes a serially connected supply line 82, heat exchanging coil 83, and return loop 84. The supply line 82 is selectively coupled to the main output line 77a of the high grade heat storage through a three-way control valve 86, while the return loop 84 is connected to the primary return line 77b. The coil 83 is in thermal communication and countercurrent relation to a heat exchanger coil 87 connected in series with the main supply line 76a of the low grade heat storage unit.

FIG. 6a schematically represents an example of a high grade heat storage unit 62. A heat storage medium 91 in solid or liquid form is contained in an insulated tank 92 and heat exchanger coils 93, 94 are provided for both communication with the high grade heat exchangers 69 and communication with the distribution lines 77a, 77b. The arrangement of FIG. 6a permits the fluids in the lines from the heat exchanger 69 and in the distribution line 77 to be isolated from one another so that they can contain different fluids, pressures and the like. One or both of the coils 93, 94 can be eliminated where, for example, the fluids, pressures, purity and the like contained in these elements are compatible. The low grade heat supplementing loop 81 is particularly useful when there is an excess of high grade heat available. Such a condition could exist, for example, in the winter season where the heating load is at a maximum and the cooling load is low. In such an instance, relatively little high grade heat is needed for cooling.

The energy system 51 illustrated in FIG. 6 is of sufficient capacity to make practical use of a fuel cell based electrical plant. Such a plant has a relatively high efficiency in the use of natural gas or like fuel to produce electricity as compared to more conventional systems utilizing a heat engine to drive electrical generating equipment. This efficiency generally improves the economics of the plant 51 in that a relatively high quantity of relatively expensive electricity is produced for a given amount of fuel consumed and heat generated by the plant. The illustrated fuel cell is an example of one of several known types of fuel cells suitable for use in practicing the invention.

A cogeneration plant, be it of the fuel cell type or of the heat engine prime mover type, when sized to serve a local community, can yield economies of scale in both initial cost and operating cost. Additionally, the components of the cogeneration energy system 51 can be sized to satisfy the collective average thermal load of the community buildings. That is, the business, commercial, and residential sectors generally will each have different daily and weekly thermal load demands which, when collectively averaged, tend to reduce peak or design day requirements, and therefore tend to reduce the modified design day thermal load. From examples 1-4, for example, it can be seen that the size of the various components will be reduced.

Although the preferred embodiments of this invention have been shown and described, it should be understood that various other modifications and rearrangements of the parts may be resorted to without departing from the scope of the invention as disclosed and claimed herein.

What is claimed is:

1. A cogeneration plant at a local site operating under the priority of supplying substantially all of its expected daily thermal load requirement which varies throughout a 24-hour period, the plant including a heat engine, a source of combustible fuel for driving the engine, electric power generating means for converting mechanical energy of the heat engine to electrical power, means interconnecting the electrical power generating means to an electrical utility grid, the utility grid experiencing a load that regularly varies significantly in magnitude throughout a 24-hour period and is characterized by a peak demand period which is substantially less than 24 hours, a heat storage unit having a capacity sized in accordance with the expected daily thermal load requirement, first means thermally connecting the engine to the heat storage unit for conducting heat energy rejected by the heat engine to the storage unit, second means thermally connecting the heat storage unit to the thermal load, control means for energization of the heat engine and generating means ordinarily exclusively during the peak rate period of the utility, and sensing means monitoring the heat value stored in the storage unit and arranged to normally override said control means when said storage unit contains a desired capacity of heat to discontinuous operation of said heat engine and generating means, said heat engine and generating means forming a set sized to run primarily through the peak rate period to develop a quantity of rejected heat equivalent to the modified design day thermal load of the site, said sensing means and control means being mutually arranged to normally assign priority of operation of said heat engine and generating means ordinarily exclusively to the condition where, during the peak demand period, the expected following 24-hour heat demand is greater than the quantity of heat contained in the heat storage unit.

2. A cogeneration plant as set forth in claim 1, wherein said heat storage unit is sized to store the heat equivalent to the modified design day thermal load requirement less the quantity of heat consumed by the thermal load during full operation of the engine and generating means in the peak rate period.

3. A cogeneration plant as set forth in claim 1, wherein the thermal load includes space heating of a building at the site and the heat storage unit is sized to satisfy approximately 50-60% of the design day space heat requirement of the building.

4. A method of conserving energy by establishing one day cycles of thermal storage in operation of a cogeneration plant at a site wherein electricity is locally generated for supplementing the power generated in a central station electric service and rejected heat is productively locally used at the site to satisfy a modified design day thermal load at the site comprising the steps of supplying combustible fuel, providing a heat activated electric power generating means, connecting the generating means to the electric power distribution grid of the central station electric service, burning the combustible fuel to operate the electric generating means, providing a heat storage unit in thermal communication with the heat activated electric generating means and with the thermal load, the heat storage capacity of the storage unit being generally limited in size to that of the modified design day thermal load at the site, the electric power generating means being sized to reject a quantity of heat generally equal to the modified design day thermal load at the site during a regular daily period of operation, and normally assigning priority of operation of the generating means to the condition where the expected following 24-hour heat demand is greater than the quantity of heat contained in the heat storage unit and operating the generating means ordinarily exclusively during the peak rate period of the central station electric service.

5. The method as set forth in claim 4, wherein said electric power generating means is sized to run through the full duration of the normal peak rate period of the central station electric service.

6. The method as set forth in claim 5, wherein the thermal storage unit is sized to contain heat equivalent to the modified design day thermal load at the site less that quantity of heat consumed by the thermal load during the period of operation of the electric generating means.

7. The method as set forth in claim 6, wherein the thermal load at the site includes space heating and the thermal storage unit is sized to provide approximately 50-60% of the design day space heating requirement of the building presenting the space heating load.

8. A cogeneration plant at a local site operating under the priority of supplying substantially all of a modified design day thermal load requirement at such site, the plant including a source of oxidizable fuel, electric power generating means for oxidizing the fuel to produce electrical power and a substantial quantity of rejected heat, means interconnecting the electrical power generating means to an electrical utility grid, the utility grid experiencing a load that regularly varies significantly in magnitude throughout a 24-hour period and is characterized by a peak demand period which is substantially less than 24 hours, a heat storage unit having a capacity sized in accordance with the modified design day thermal load requirement, first means thermally connecting the electric power generating means to the heat storage unit for conducting heat energy rejected by the electric power generating means to the storage unit, second means thermally connecting the heat storage unit to the thermal load, control means for energization of the electric power generating means ordinarily exclusively during the peak rate period of the utility, and sensing means monitoring the heat value stored in the storage unit and arranged to normally override said control means when said storage unit contains a desired capacity of heat to discontinue operation of said generating means, said sensing means and control means being mutually arranged to normally assign priority of operation of said electric power generating means ordinarily exclusively to the condition where, during the peak demand period, the expected following 24-hour modified design day thermal load requirement is greater than the quantity of heat contained in the heat storage unit.

9. A cogeneration plant as set forth in claim 8, wherein said heat storage unit is thermally connected to a plurality of separate buildings at said site.

10. A cogeneration plant as set forth in claim 8, wherein said electrical power generating means includes a heat engine operated by combustion of said fuel.

11. A cogeneration plant as set forth in claim 9, wherein said electrical power generating means comprises a fuel cell that electrochemically produces electricity and rejected heat by oxidation of fuel.

12. A cogeneration plant as set forth in claim 11, wherein said fuel cell is arranged to reject heat at two separate temperature levels, said heat storage unit including separate sections for each of said temperature levels.

13. A cogeneration plant as set forth in claim 12, wherein one of said sections is arranged to store low grade heat suitable for space heating and the other one of said sections is arranged to store high grade heat suitable for space cooling through an absorption type process.

14. A cogenerating plant as set forth in claim 12, including means to selectively direct high grade heat from a high temperature one of said sections to circuits normally supplied heat by the other of said sections.

15. A method of conserving energy by establishing one day cycles of thermal storage operation of a cogeneration plant at a site wherein electricity is locally generated for supplementing the power generated in a central station electric service and rejected heat is productively locally used at the site to satisfy a modified design day thermal load at the site comprising the steps of supplying oxidizable fuel, providing electric power generating means that operates in a manner which produces substantial rejected heat, connecting the generating means to the electric power distribution grid of the central station electric service, oxidizing the fuel to operate the electric generating means, providing a heat storage unit in thermal communication with the electric generating means and with the thermal load, the heat storage capacity of the storage unit being limited in size to that of the modified design day thermal load at the site, the electric power generating means being sized to reject a quantity of heat generally equal to the modified design day thermal load at the site during a regular daily period of operation, and normally assigning priority of operation of the generating means to the condition where the expected following 24-hour heat demand is greater than the quantity of heat contained in the heat storage unit and operating the generating means ordinarily exclusively during the peak rate period of the central station electric service.

16. The method as set forth in claim 15, wherein the thermal load at the site comprises space conditioning of a plurality of separate buildings and such buildings are served by a common thermal storage unit.

17. The method as set forth in claim 16, wherein the thermal storage unit is sized to satisfy the collective average modified design day thermal load of said plurality of separate buildings.

18. The method as set forth in claim 15, wherein during the operation of said electric generating means heat is recovered at two temperature levels and stored in high grade and low grade sections of said thermal storage unit.

* * * * *

UNITED STATES PATENT AND TRADEMARK OFFICE
CERTIFICATE OF CORRECTION

PATENT NO. : 4,510,756

DATED : April 16, 1985

INVENTOR(S) : Ralph E. Hise et al.

It is certified that error appears in the above-identified patent and that said Letters Patent are hereby corrected as shown below:

Column 10, claim 11, delete "claim 9" and substitute therefor --claim 8--.

Signed and Sealed this

Twenty-ninth Day of October 1985

[SEAL]

Attest:

Attesting Officer

DONALD J. QUIGG

Commissioner of Patents and Trademarks—Designate